United States Patent
Wijmans et al.

(10) Patent No.: US 8,128,733 B2
(45) Date of Patent: Mar. 6, 2012

(54) EFFICIENT GAS-SEPARATION PROCESS TO UPGRADE DILUTE METHANE STREAM FOR USE AS FUEL

(75) Inventors: Johannes G. Wijmans, Menlo Park, CA (US); Timothy C. Merkel, Menlo Park, CA (US); Haiqing Lin, Mountain View, CA (US); Scott Thompson, Brecksville, OH (US); Ramin Daniels, San Jose, CA (US)

(73) Assignee: Membrane Technology & Research, Inc, Menlo Park, CA (US)

( * ) Notice: Subject to any disclaimer, the term of this patent is extended or adjusted under 35 U.S.C. 154(b) by 428 days.

(21) Appl. No.: 12/454,084

(22) Filed: May 11, 2009

(65) Prior Publication Data
US 2009/0277328 A1    Nov. 12, 2009

Related U.S. Application Data

(60) Provisional application No. 61/127,415, filed on May 12, 2008.

(51) Int. Cl.
*B01D 53/22* (2006.01)
(52) U.S. Cl. ........... 95/51; 95/43; 95/45; 95/54; 62/606; 62/624
(58) Field of Classification Search .............. 95/43, 45, 95/51, 54; 62/606, 624
See application file for complete search history.

(56) References Cited

U.S. PATENT DOCUMENTS

| | | | | |
|---|---|---|---|---|
| 4,518,399 A * | 5/1985 | Croskell et al. | | 95/51 |
| 4,602,477 A * | 7/1986 | Lucadamo | | 62/624 |
| 4,639,257 A * | 1/1987 | Duckett et al. | | 62/624 |
| 4,755,192 A * | 7/1988 | Koros et al. | | 95/50 |
| 4,931,070 A | 6/1990 | Prasad | | |
| 5,067,971 A * | 11/1991 | Bikson et al. | | 95/52 |
| 5,240,471 A | 8/1993 | Barbe et al. | | |
| 5,332,424 A * | 7/1994 | Rao et al. | | 95/47 |
| 5,500,036 A | 3/1996 | Kalthod | | |
| 5,641,337 A | 6/1997 | Arrowsmith et al. | | |
| 5,681,433 A | 10/1997 | Friesen et al. | | |
| 5,753,010 A * | 5/1998 | Sircar et al. | | 95/45 |
| 5,843,209 A | 12/1998 | Ray et al. | | |
| 6,478,852 B1 | 11/2002 | Callaghan et al. | | |
| 6,592,650 B2 * | 7/2003 | Pinnau et al. | | 95/47 |
| 2002/0078824 A1 * | 6/2002 | Tom et al. | | 95/45 |

OTHER PUBLICATIONS

US 4,981,498, 01/1991, Bikson et al. (withdrawn)

* cited by examiner

*Primary Examiner* — Jason M Greene
*Assistant Examiner* — Anthony Shumate
(74) *Attorney, Agent, or Firm* — J. Farrant; K. Bear

(57) ABSTRACT

A membrane-based gas separation process for treating gas streams that contain methane in low concentrations. The invention involves flowing the stream to be treated across the feed side of a membrane and flowing a sweep gas stream, usually air, across the permeate side. Carbon dioxide permeates the membrane preferentially and is picked up in the sweep air stream on the permeate side; oxygen permeates in the other direction and is picked up in the methane-containing stream. The resulting residue stream is enriched in methane as well as oxygen and has an EMC value enabling it to be either flared or combusted by mixing with ordinary air.

16 Claims, 8 Drawing Sheets

(not in accordance with the invention)

EFFICIENT GAS-SEPARATION PROCESS TO UPGRADE DILUTE METHANE STREAM FOR USE AS FUEL

This application claims the benefit of U.S. Provisional Application Ser. No. 61/127,415, filed May 12, 2008 and incorporated herein by reference.

This invention was made in part with Government support under award numbers DE-FG02-06ER84609 and DE-FG02-07ER84819, awarded by the United States Department of Energy. The Government has certain rights in this invention.

FIELD OF THE INVENTION

The invention relates to gas separation membranes, and specifically to processes using a sweep gas on the permeate side of the membranes to upgrade streams containing methane in low concentrations for use as fuel.

BACKGROUND OF THE INVENTION

Methane is a valuable energy resource, but, after carbon dioxide, is the largest contributor to global warming. Methane accounts for about 10% of U.S. greenhouse gas emissions, and has almost eight times the global warming effect of an equivalent volume of carbon dioxide (21 times on a mass basis). Most emissions take the form of dilute mixtures of methane and carbon dioxide, with a methane content below 70%, and arise from landfills, from natural gas and oil processing, and from cattle or other biogas sources.

Many landfill, biogas and natural gas processing vent streams, for example, contain 20 to 70% methane. These streams have a low Btu value (200 to 700 Btu/Scf), too low to be used as fuel in conventional engines, which generally require a minimum of 700 Btu/Scf. To dispose of these gases, they are either vented or mixed with supplemental fuel to bring the gas up to a Btu value of 500 Btu/Scf, at which point the gas can be flared. In either case, the heating value of the methane in the gas is lost.

If the concentration of methane in the stream could be increased, it would be possible to use the stream as combustion fuel, or at least to dispose of it by flaring, thereby converting the methane to carbon dioxide before it is emitted. However, such streams are difficult to treat in ways that are both technically and economically practical, and there remains a need for better treatment techniques.

Gas separation by means of membranes is a well established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, or there may be additional driving force provided by keeping the total feed pressure higher than the total permeate pressure.

Using a sweep gas has most commonly been proposed in connection with air separation to make nitrogen or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070; 4,981,498 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

SUMMARY OF THE INVENTION

The invention is a membrane-based gas separation process for treating gas streams that contain methane, but in concentrations that are too dilute for the gas to be useful as fuel, or to be flared without adding fuel. Expressed another way, the invention increases the EMC of a gas stream containing methane and carbon dioxide, where EMC is explained below.

By too dilute, we mean streams typically containing less than about 70 vol % methane. However, within the scope of the invention, the process can treat streams containing much lower concentrations of methane, such as less than 50 vol % methane, less than 40 vol % methane, less than 30 vol % methane, less than 20 vol % methane or even less, as well as treating streams with a higher methane concentration than 70 vol % if it is required to do so.

Any other components may be present in the stream in addition to methane. Carbon dioxide is usually present, and may be the major component of the stream. If carbon dioxide is present, the concentration will usually be between about 20 and 90 vol %. Depending on the source, other typical components include, but are not limited to, nitrogen, oxygen, water vapor, and other light hydrocarbons, such as ethane, propane and butane.

The process involves upgrading the methane content of the stream to bring it to a composition that can be burnt with air as a useful fuel, or can at least be flared, thereby converting methane to carbon dioxide. This option does not provide any energy recovery, but at least reduces the GWP of the emissions seven-fold.

The dilute stream of low methane content is passed across one side of a membrane and an oxygen-containing stream, usually, but not necessarily, air is passed as a sweep gas on the other side. Carbon dioxide permeates the membrane preferentially and is picked up in the sweep air stream on the permeate side.

If there is little or no oxygen in the feed, oxygen will also permeate the membrane preferentially from the sweep side and be picked up in the methane stream on the feed side.

The resulting gas on the feed side has a higher oxygen content, a lower carbon dioxide content and, in most cases, a higher methane content than the raw gas, and is combustible when mixed with ordinary air. This makes the gas suitable for use as fuel for an engine, heater or boiler. The process reduces global warming emissions, and converts what was previously a waste stream into useful fuel.

Membranes that may be used to carry out the separations should exhibit high permeance for carbon dioxide, such as at least about 300 gpu, more preferably at least about 500 gpu and most preferably at least about 1,000 gpu under the operating conditions of the process. A carbon dioxide/methane selectivity of at least about 5, 10, or more preferably even 20 under the operating conditions of the process is desirable.

It is also preferred that any $C_{2+}$ hydrocarbon components present in the feed stream are retained on the feed side of the membrane, so as not to decrease the already limited Btu value of the gas. Thus, the most preferred selective layer materials are highly permeable to carbon dioxide, but relatively impermeable to methane, and even less permeable to $C_{2+}$ hydrocarbons.

In the event that the membranes are intended to counter-permeate oxygen from the permeate side to the feed side, the membranes should preferably exhibit an oxygen permeance of at least about 50 gpu or 100 gpu, and an oxygen/nitrogen selectivity of at least about 2 or more preferably 2.5 under the operating conditions of the process is also preferred.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series or parallel flow arrangements as is well known in the art. Any number of membrane modules may be used.

The process is particularly useful in applications that are energy-sensitive, as may be the case when very large streams are to be processed, or when installing or operating large compressors or vacuum pumps is too costly.

The process is also particularly useful in separations that are pressure-ratio limited, as will be explained in more detail below.

The process may be operated purely in sweep mode, that is, with the total gas pressure on both sides of the membrane being about the same. In this case, membrane permeation is driven solely by concentration gradients, no compressors or vacuum pumps are needed and the process is completely passive.

Optionally, the driving force for transmembrane permeation of carbon dioxide may be augmented by operating the membrane unit with higher total pressure on the feed side than on the permeate side. Likewise, if desired, the driving force for transmembrane counter-permeation of oxygen may be augmented by operating the membrane unit with higher total pressure on the permeate feed side than on the feed side.

By using sweep-mode operation and by using air or other oxygen-containing gas as the sweep gas, the membrane separation step is carried out in a very energy efficient manner, without introducing any additional unwanted components into the feed stream, and in many cases by introducing beneficial oxygen into the gas mixture under treatment.

It is highly preferred that the feed gas flow direction across the membrane on the feed side and the sweep gas flow direction across the membrane on the permeate side are substantially countercurrent to each other. In the alternative, the relative flow directions may be substantially crosscurrent, or less preferred, cocurrent.

In a basic embodiment, the process of the invention includes the following steps:
(a) providing a membrane having a feed side and a permeate side, and being selectively permeable to carbon dioxide over methane and to oxygen over nitrogen;
(b) passing a raw gas stream comprising methane and carbon dioxide, and having a first EMC, across the feed side;
(c) passing an oxygen-containing stream across the permeate side;
(d) withdrawing from the feed side a residue stream having a second EMC that is higher than the first EMC;
(e) withdrawing from the permeate side a permeate stream that is enriched in carbon dioxide compared with the oxygen-containing stream.

DETAILED DESCRIPTION OF THE INVENTION

Gas percentages given herein are by volume unless stated otherwise.

The invention is a process for treating gas streams that contain methane, but which is too dilute in methane for the gas to be useful as fuel. By this, we mean streams containing less than about 70 vol % methane, although the process can treat streams containing much lower concentrations of methane, such as less than 50 vol % methane, less than 40 vol % methane, less than 30 vol % methane, less than 20 vol % methane or even less.

In another aspect, the invention is a process for upgrading a methane-containing stream by increasing the EMC, as explained below.

Such streams are difficult to treat by conventional processes in an energy-efficient manner, and contribute significantly to global greenhouse gas emissions if simply vented or flared.

Table 1 compares the global warming potential of a representative stream containing 20 vol % methane if emitted directly to the atmosphere, flared, or used as fuel.

TABLE 1

Global warming potential (GWP) of methane-containing emissions (based on GWP coefficient of carbon dioxide of 1 and of methane of 7.6)

| Option | Composition and Volume of Emission | GWP of Emission | GWP Reduction |
|---|---|---|---|
| Straight emission | 20% methane 80% carbon dioxide 1 volume | $1 \times 0.2 \times 7.6 +$ $1 \times 0.8 \times 1.0 = 2.32$ | — |
| Flared, requiring additional 0.6 vol. of methane | 100% carbon dioxide 1.6 volume | $1.6 \times 1.0 \times 1.0 = 1.6$ | 31% |
| Useful combustion without additional methane | 100% carbon dioxide 0.8 volume* | $0.8 \times 1.0 \times 1.0 = 0.8$ | 66% |

*Credit is taken for the 0.2 volume of methane usefully combusted.

If the stream is simply vented without treatment, the methane contributes most of the global warming potential (GWP) of the stream, even though the methane content is only 20%. Simple flaring (using additional methane to reach at least 500 Btu/scf) reduces the GWP by 31%. However, the best solution is to burn the stream as fuel, without adding any additional methane. In this case, the GWP can be reduced by 66%. This option requires a carbon dioxide/methane separation step, however.

Our invention makes this option possible in a cost-effective way, because the cost of separation is at least partly covered by the value of fuel produced.

Figure 2:
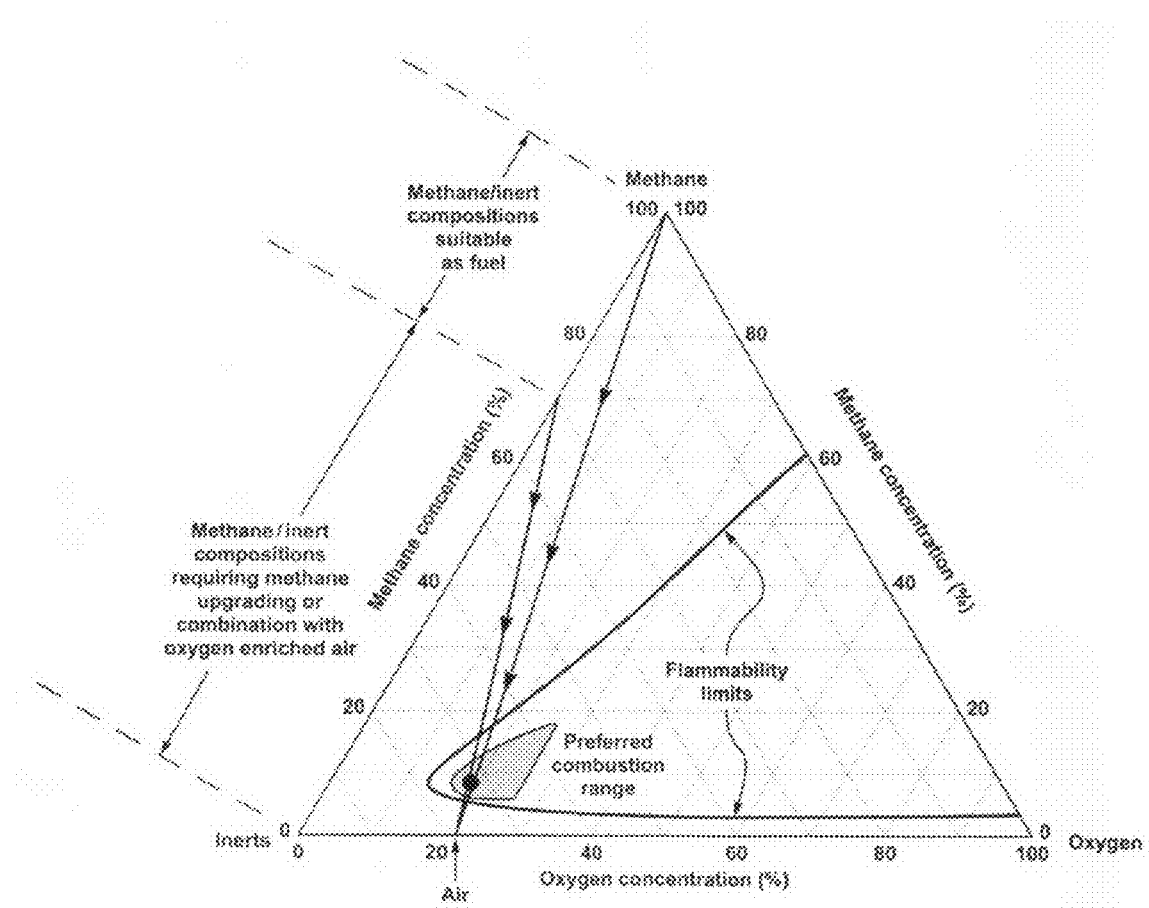
FIG. 2 is a ternary composition diagram for methane/oxygen/inert gas mixtures, indicating flammability limits and a preferred combustion zone.

Combustion of methane-containing gas mixtures is best described by a ternary composition diagram of the type shown in FIG. 2. In this figure, the three components in the gas mixture are methane, oxygen, and a generic inert gas component, which represents the sum of all inert components in the mixture. Typically, but not necessarily, such inert components include nitrogen, carbon dioxide and other gases found in common air or gas mixtures that do not take part in combustion.

The apexes of the triangle represent pure methane, pure oxygen and pure inert gas. Binary mixtures are represented by positions along the sides of the triangle. Mixtures of all three components are represented by points within the triangle; each mixture composition is represented by a single point.

The diagram is divided into two regions—the flammable region or combustion zone, indicated by the flammability envelope, within which combustion is possible, and the non-flammable region, outside the envelope, where it is not.

A small preferred combustion region within the flammable region is also shown. This region is preferred because it is away from the edges of the flammable region, thereby ensuring that minor concentration fluctuations do not take the mixture outside the combustion envelope. The region is also relatively lean in oxygen (below 28% oxygen) to avoid overly high combustion temperatures, which can lead to NOx formation.

Those of skill in the art will appreciate that the preferred combustion region should be chosen according to the specifics of the target separation to be carried out. The scope of the invention is not limited to the representative zone shown in FIG. 2 and includes all processes that bring the gas to be treated to a composition within the combustion envelope.

One of the characteristic features of a ternary diagram is that all gas compositions that can be obtained by combining two gas mixtures of different composition are represented by a straight line between the two gas mixture compositions.

Following this rule, as shown in FIG. 2, any binary methane/inert gas mixture containing more than about 70% methane can be mixed with ordinary air (21% oxygen) to form a mixture that is within the preferred combustion range. A representative point having an oxygen:methane ratio in the composition of 2:1, the stoichiometric ratio for conversion of methane to carbon dioxide, is indicated on the diagram.

The lines connecting binary mixtures containing less than about 60% or 70% methane in inerts and air do not pass through the preferred combustion region. Therefore, these mixtures cannot be burned in air. To bring these methane/inert mixtures into the combustion range, the gas must be upgraded, either by increasing the methane content or by mixing with oxygen-enriched air rather than ordinary air.

Equivalent Methane Concentration (EMC): Definition and Explanation

FIG. 2 shows that a 70% methane-in-inert mixture can be combusted when mixed with regular air. However, mixtures with less than 70% methane can also be combusted with air, provided that the methane mixture itself contains a sufficient amount of oxygen. All compositions in the three-component diagram on the line connecting the 70% methane/30% inert point with the air point (21% oxygen/79% inert) have a methane concentration below 70%. However, all gas mixtures of these compositions can be combusted just as easily as the 70% methane/30% inert mixture, because they contain a certain amount of oxygen before being mixed with air, and therefore require less air for combustion. These compositions are therefore defined as having an Equivalent Methane Concentration (EMC) of 70%.

It can be shown that any ternary composition created by mixing an X % methane-in-inert mixture with air (21% oxygen-in-inert mixture) is characterized by $$\frac{A}{X} + \frac{B}{21} = 1 \tag{1}$$

where A is the methane concentration of the ternary mixture and B is the oxygen concentration of the ternary mixture.

Therefore, all ternary compositions that satisfy Equation (1) have an EMC equal to X % and the EMC of any mixture can be calculated from:

$$EMC = \frac{A}{1 - B/21} \tag{2}$$

For example, a mixture containing 50% methane is as easily combusted as a 70% methane mixture if the mixture containing 50% methane also contains 6% oxygen:

$$EMC = \frac{50\%}{1 - 6\%/21\%} = 70\% \tag{3}$$

The fuel value per unit volume of the 50% mixture is only 5/7 that of the 70% mixture, however, because the hydrocarbon content is lower.

It will be apparent to those of skill in the art that a similar calculation could be performed to for any other EMC value than 70%.

Best Mode of Carrying Out the Invention

The process of the invention provides a method to upgrade any dilute methane stream to a desired methane concentration for use as fuel in an engine, heater or boiler, or at least to be suitable for flaring.

In other words, our process converts methane/inert gas mixtures with low methane concentrations and low EMC values into compositions of higher EMC value. Preferably the gas is upgraded to have an EMC of at least about 60%, more preferably at least about 70%.

Figure 1:
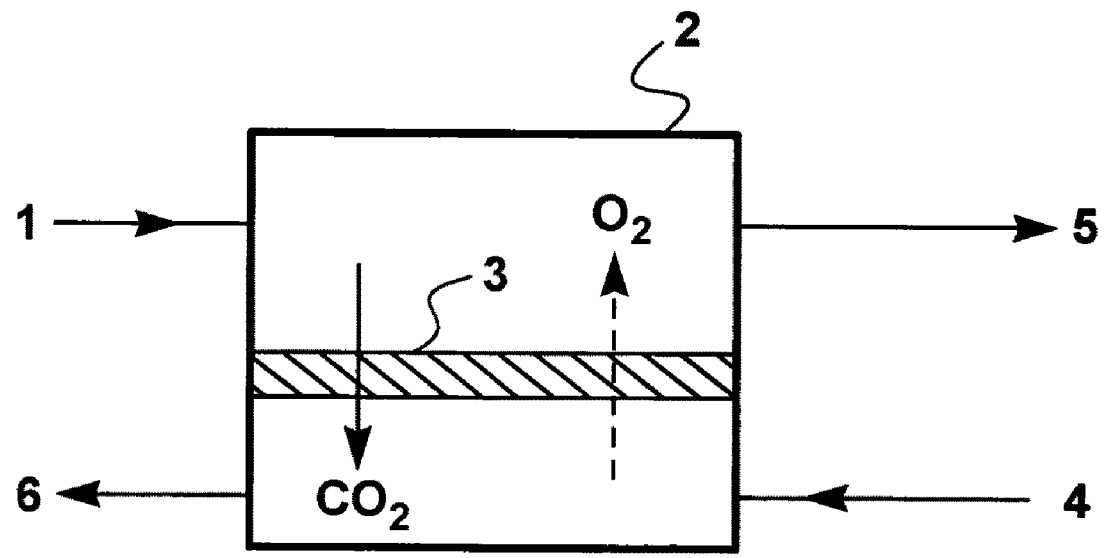
FIG. 1 is a schematic drawing of a flow scheme for a basic embodiment of the invention.

A basic embodiment of the invention is shown in FIG. 1. Referring to this figure, a feed stream, 1, containing at least methane and an inert gas, and having a composition that is outside the preferred combustion zone when mixed with ordinary air, is passed into membrane separation unit, 2, containing membranes, 3. In the figure, it is assumed for simplicity that the inert gas is carbon dioxide; in practice this will commonly, but not necessarily, be the case.

The membranes are chosen to be selectively permeable to carbon dioxide over methane, so that carbon dioxide will permeate preferentially from the feed to the permeate side, as indicated by the arrow in the figure.

A stream of air, oxygen-enriched air, oxygen, or any oxygen-containing gas is passed as a sweep stream, 4, across the permeate side of the membranes. The membrane is also selected to be selectively permeable to oxygen over nitrogen. If there is little or no oxygen in the feed stream, oxygen will permeate preferentially from the permeate to the feed, as indicated by the second arrow in the figure.

Any membrane with suitable performance properties may be used. The membrane may take the form of a homogeneous film, an integral asymmetric membrane, a multilayer composite membrane, a membrane incorporating a gel or liquid layer or particulates, or any other form known in the art.

The preferred membrane is a polymeric membrane. Many polymers, especially rubbery polymers, are very permeable to carbon dioxide. A representative and preferred category of materials is the polyether-based polymers and copolymers, including block copolymers. Representative polymeric materials of this class are the polyamide-polyether block copolymers available commercially as Pebax® from Arkema, Philadelphia, Pa.

Polyether-based polymers are usually extremely permeable to carbon dioxide and offer high selectivity for carbon dioxide over methane and nitrogen. However, they tend to be more permeable to $C_{2+}$ hydrocarbons than methane, so some loss of higher hydrocarbons into the permeate stream is possible if such components are present in the feed. However, this deficit may be offset by the extraordinarily high carbon dioxide permeances, which lead to low capital costs for the membrane unit.

If higher hydrocarbons are present in the feed and their retention is a higher priority than capital cost, suitable materials are glassy polymers, particularly and preferably the fluorinated ring polymers, such as Hyflon® and Cytop®, described in detail in U.S. Pat. Nos. 6,361,582 and 6,361,583.

The membranes may be manufactured as flat sheets or as fibers and housed in any convenient module form, including spiral-wound modules, plate-and-frame modules and potted hollow-fiber modules. The making of all these types of membranes and modules is well known in the art. To provide countercurrent flow of the sweep gas stream, the modules preferably take the form of hollow-fiber modules, plate-and-frame modules or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 2 may contain a single membrane module or bank of membrane modules or an array of modules. A single unit or stage containing one or a bank of membrane modules is adequate for many applications. If the residue stream requires further purification, it may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multistage, multistep, or more complicated arrays of two or more units in serial or cascade arrangements.

In the simplest case as shown in the figure, both the feed and the permeate streams are passed across the membrane at about atmospheric pressure. Because of the differences in partial pressures across the membrane, carbon dioxide permeates into the sweep stream and oxygen permeates into the methane stream. The result is a residue stream, 5, with increased methane concentration, and to which oxygen has also been added. This residue stream has a higher EMC than the raw gas feed stream because it has an increased methane content, plus some oxygen, and may be sent to a fuel line for use as engine, turbine or boiler fuel. Alternatively, if the intent was simply to bring the gas to a composition suitable for flaring, it can be flared, preferably without the use of any additional fuel.

A total pressure difference between the feed and permeate gas streams is not required to operate the process; however in cases where the feed is available at above atmospheric, the removal of carbon dioxide can be facilitated by a pressure difference between the feed and permeate sides. Optionally the driving force for transmembrane permeation may be augmented by compressing the gas on the feed side or drawing a partial vacuum on the permeate side, or both.

In evaluating whether to operate the process in passive sweep mode alone or to provide additional pressure driving force, a number of factors should be taken into consideration.

The separation of components achieved by the membrane unit depends not only on the selectivity of the membrane for the components to be separated, but also on the pressure ratio.

By pressure ratio, we mean the ratio of total feed pressure/ total permeate pressure. In pressure driven processes, it can be shown mathematically that the enrichment of a component (that is, the ratio of component permeate partial pressure/ component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure-ratio limited. For example, a process in which a membrane selectivity of 10, 20 or above is possible (such as is the case for carbon dioxide/ nitrogen and carbon dioxide/methane separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 4, thereby preventing the permeate side concentration building up to a limiting level.

The total gas pressures on each side of the membrane may be the same or different, therefore, and each may be above or below atmospheric pressure. As mentioned above, if the pressures are about the same, the entire driving force is provided by the sweep mode operation.

In most cases, it is preferred not to use either significant compression on the feed side or significant vacuum on the permeate side, and to operate in essentially passive mode, using only a blower to pass the sweep gas through the modules. This is a very energy efficient way to carry out the process.

For the feed side, slight compression, such as from atmospheric to a few tens of psig, such as 50 psig, can be helpful in achieving high total carbon dioxide flux without resorting to very large membrane areas.

For the permeate side, a pressure of at least atmospheric pressure is preferred to facilitate discharge or disposal of stream 6.

The partial pressure of carbon dioxide on the permeate side may be controlled by adjusting the flow rate of the sweep stream to a desired value. In principle the ratio of sweep gas flow to feed gas flow may be any value that provides the desired results, although the ratio sweep gas flow:feed gas flow will seldom be less than 0.1 or greater than 10. High ratios (that is, high sweep flow rate) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rate) achieve high concentrations of carbon dioxide in the permeate, but relatively low levels of carbon dioxide removal from the feed.

Use of a too low sweep rate may provide insufficient driving force for a good separation, and use of an overly high sweep flow rate may lead to pressure drop or other problems on the permeate side.

Typically and preferably, the flow rate of the sweep stream should be between about 50% and 200% of the flow rate of the membrane feed stream, and most preferably between about 80% and 120%. Often a ratio of about 1:1 is convenient and appropriate.

Figure 4:
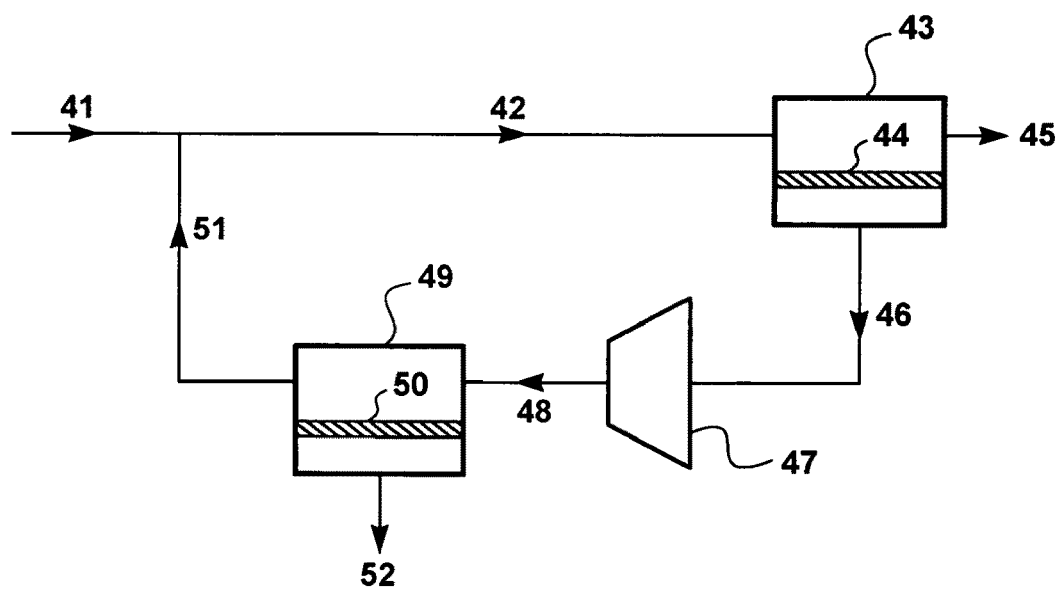
FIG. 4 (not in accordance with the invention), shows a two-stage membrane process used to treat a natural gas stream containing 10% carbon dioxide.
Figure 5:
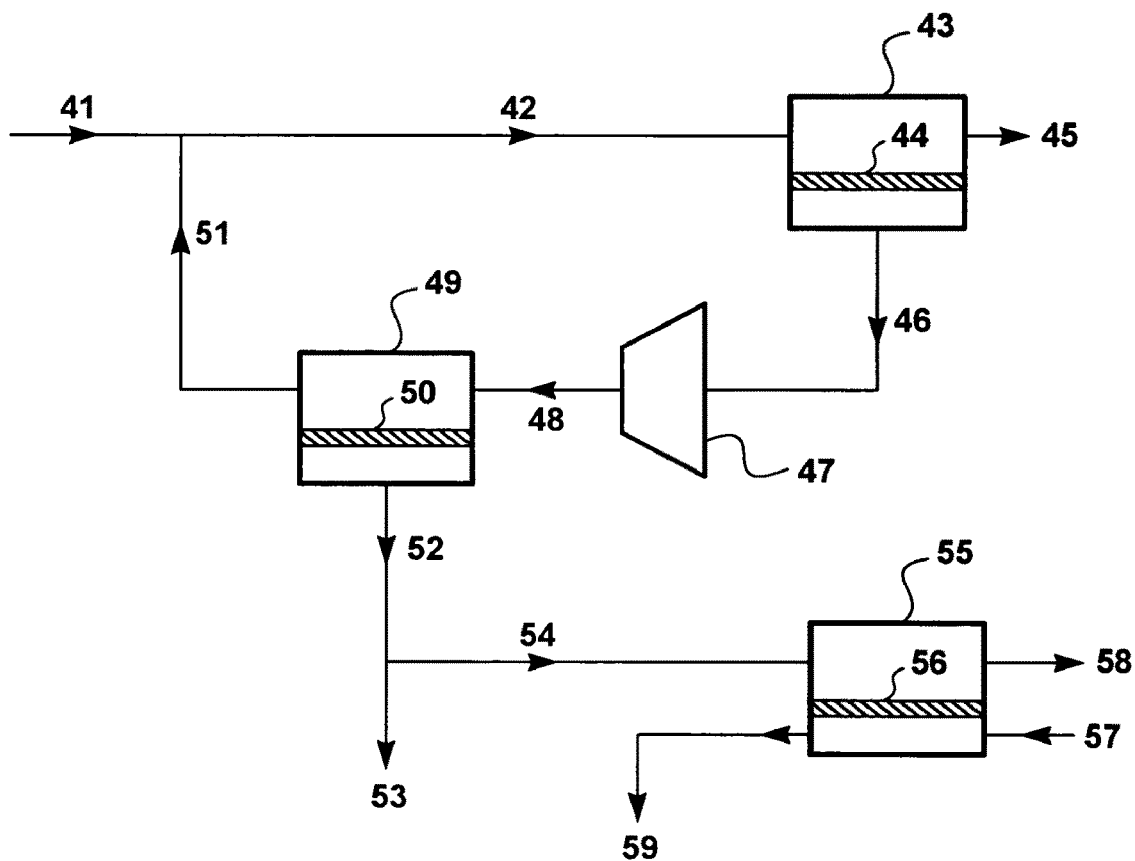
FIG. 5 shows a process of the invention for upgrading a waste stream from the process of FIG. 4.

FIGS. 4 and 5 illustrate a representative preferred application of the invention to natural gas processing. FIG. 4, not in accordance with the invention, shows a conventional two-stage pressure-driven membrane process used, for example, to treat a natural gas stream from any source that contains carbon dioxide in a concentration too high for the gas to be sent to a gas pipeline or to be used without treatment.

Referring to the figure, gas stream, 41, containing at least methane and carbon dioxide, is combined with return stream, 51, and passed as feed stream, 42, to first membrane separation step or unit, 43. It is assumed that the natural gas is available at elevated pressure; optionally, a feed compressor might be used to compress stream 41 to a suitable processing pressure, such as 1,000 psia.

The membrane unit is equipped with membranes, 44, selective in favor of carbon dioxide over methane. The driving force for transmembrane permeation is the difference between the feed and permeate side pressures. The step separates the raw gas into a carbon dioxide lean residue stream, 45, which meets pipeline or other target specification, and a permeate stream, 46, enriched in carbon dioxide.

Stream 46 contains too much methane to discharge, so is recompressed in compression step, 47, and sent as compressed feed stream, 48, to second membrane separation step, 49. This step uses membranes, 50, selectively permeable to carbon dioxide, and generates a methane-rich residue stream, 51, which is returned to the front of the process to recover additional methane. The step also yields a second permeate stream, 52, which is discharged as a waste stream from the process.

Depending on the content of carbon dioxide in the raw gas, and the process operating parameters, stream 52 may still contain as much as 20, 30 or 40 vol % methane, for example.

By way of illustration, a raw gas flow of 10 MMscfd containing 10 vol % carbon dioxide may result in a waste gas flow of over 1 MMscfd, containing 30-40 vol % methane. Venting or flaring this gas is not only environmentally damaging, but represents a loss of about 5% or more of the methane content of the raw gas.

FIG. 5 shows a similar process, now incorporating a sweep-driven carbon dioxide/oxygen exchange step in accordance with the invention. Like elements in FIG. 5 are labeled as in FIG. 4. Referring to FIG. 5, a portion, 53, of second permeate stream 52 is still discharged, and a second portion, 54, is sent for treatment in membrane separation step or unit, 55, containing membranes, 56, that are selective for carbon dioxide over methane and for oxygen over nitrogen.

Air sweep stream, 57, is passed across the permeate side of the membranes. Oxygen permeate from the air into the methane stream on the feed side, and carbon dioxide permeates from the methane stream to the air on the permeate side. Residue stream, 58, enriched in methane content and now containing some oxygen, is withdrawn from the feed side as an EMC upgraded product stream. This stream may be sent to a fuel line to be burnt as fuel to drive the compression step, or otherwise used as desired.

The ability of the process flow scheme of FIG. 5 to generate fuel to drive compressor 47 provides improved flexibility compared with the process design of FIG. 4. The essentially free fuel supply may enable the compression step to operate at higher horsepower capacity, thereby increasing the driving force for transmembrane permeation in the pressure driven membrane steps and reducing the membrane area required to carry out the process.

Permeate/sweep stream, 59, is discharged. As shown in the examples below, the methane content of the discharge stream from the membranes can be reduced to just a few percent. The overall methane loss of the process can be cut to a very low level, depending on the ratio of gas flow in streams 53 and 54. In the event that all of the gas is treated, and none is discharged as stream 53, the overall methane loss may be of the process may be reduced below 1%, such as 0.5%, 0.3% or less of the raw methane content.

An option in any embodiment of the invention is to use a blower/turbine combination to drive the small blower that moves sweep air across the permeate side. The sweep/permeate stream exiting the sweep-driven membrane separation step is significantly larger in volume than the air sweep entering, by a factor of 1.5 to 2 times. This provides the possibility of driving the air sweep entirely with a small turbine on the exhaust stream. This is possible if the turbine/blower combination is efficient and if the pressure drop on the sweep side is not too high.

The invention is now further described by the following examples, which are intended to be illustrative of the invention, but are not intended to limit the scope or underlying principles in any way.

EXAMPLES

Example 1

Bases of Calculations for Other Examples (a) Membrane Permeation Experiments:
(i) A set of permeation experiments was performed with a composite membrane having a polyether-based selective layer. The pure gas permeation properties of the membrane as measured at 100 psia and 30° C. are shown in Table 1.

TABLE 2

| Gas | Permeance (gpu)* | $CO_2$/Gas Selectivity |
|---|---|---|
| Carbon dioxide | 1,000 | — |
| Nitrogen | 20 | 50 |
| Oxygen | 50 | 20 |
| Methane | 50 | 20 |
| Water** | >2,000 | |

*Gas permeation unit; 1 gpu = 1 × 10−6 cm$^3$(STP)/cm$^2$ · s · cmHg
**Estimated, not measured (ii) A set of permeation experiments was performed with a composite membrane having a fluorinated selective layer, of the type described in detail in U.S. Pat. Nos. 6,361,582 and 6,361,583. The pure gas permeation properties of the membrane as measured at 100 psia and 30 C are shown in Table 3.

TABLE 3

| Gas | Permeance (gpu) | $CO_2$/Gas Selectivity |
|---|---|---|
| Carbon dioxide | 160 | — |
| Nitrogen | 32 | 5 |
| Oxygen | 100 | 1.6 |
| Methane | 16 | 10 |

(b) Calculation methodology: All calculations were performed with a modeling program, ChemCad 5.5 (ChemStations, Inc., Houston, Tex.), containing code for the membrane operation developed by MTR's engineering group, For the calculations, all compressors and vacuum pumps were assumed to be 75% efficient.

Example 2

Process of the Invention

A calculation was performed to illustrate the treatment of a raw methane-containing gas stream according to the process of FIG. 1. The feed gas (stream 1) was assumed to contain 20% methane and 80% carbon dioxide; this composition is typical of a landfill gas stream at a later stage of operation, or of an off-gas from an amine absorption natural gas processing plant. The calculations also assumed that the feed gas to the membrane separation step was at 50 psig, again a typical representative number for landfill gas or various process off-gases.

Air at atmospheric pressure (stream 4) was assumed to be circulated on the other side of the membrane using a blower.

The assumptions for the membrane performance were as in Example 1(a)(ii).

The results of the calculation are shown in Table 4.

TABLE 4

| | Stream | | | |
|---|---|---|---|---|
| Parameter | 1 Feed | 5 Residue | 4 Sweep | 6 Permeate/Sweep |
| Flow rate (MMscfd) | 1 | 0.3 | 2 | 2.7 |
| Pressure (psig) | 50 | 50 | 0 | 0 |
| Component (vol %) | | | | |
| Methane | 20 | 53.6 | — | 1.4 |
| Carbon Dioxide | 80 | 32.8 | — | 26 |
| Oxygen | — | 4.9 | 21 | 15 |
| Nitrogen | — | 8.7 | 79 | 57.6 |

As can be seen, the process produces a treated residue stream (stream 5) with a methane concentration that has increased to 54 vol %; 5 vol % oxygen has also been added to the stream.

The resulting stream has an EMC of 70% and can easily be used as engine, turbine or boiler fuel, even though the gas contains only 53.6% methane and has a Btu value of 530 Btu/Scf.

This is because the gas also contains 4.9% oxygen, thus requiring that less additional air be mixed with the gas to bring the oxygen concentration to the level of approximately 18% required for good combustion.

Figure 3:
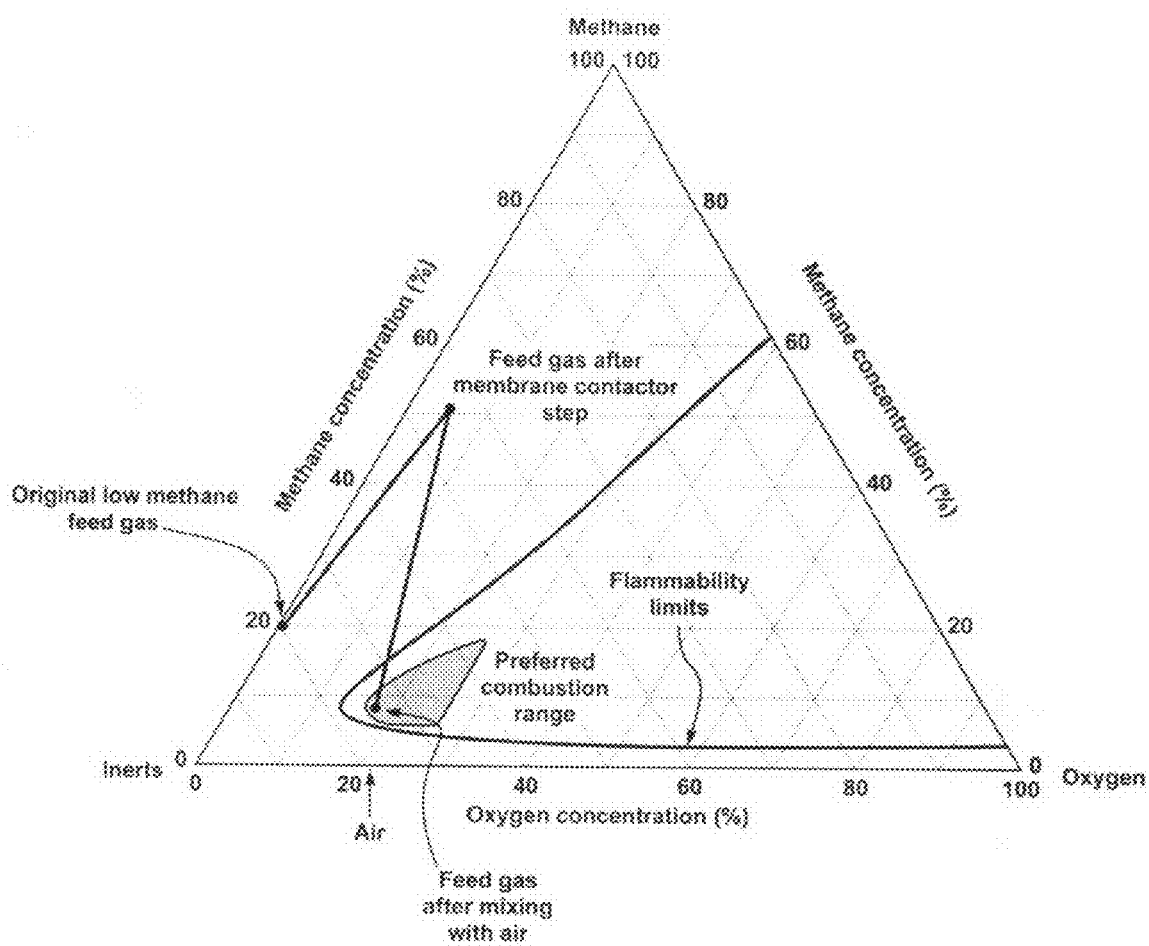
FIG. 3 is a ternary composition diagram showing the composition of a feed gas containing 20 vol % methane after treatment according to the invention, and the composition after mixing the treated gas with an appropriate amount of air to render the gas combustible as fuel.

The ternary composition diagram positions of the low methane feed gas, the methane concentrate gas, and the methane concentrate gas after mixing with an appropriate amount of air are shown in FIG. 3.

The sweep air leaving the contactor (stream 6) contains 26% carbon dioxide and only 1.4% methane and can be discharged to the atmosphere. The process recovers 80% of the methane that would otherwise be lost in the waste or off-gas stream.

Example 3

Not in Accordance with the Invention

A calculation was performed to illustrate a conventional two-stage process for treating raw natural gas containing 10 vol % according to the process flow scheme of FIG. 4.

It was assumed that the feed gas (stream 41) is available at 1,00 psia (985 psig) and that a pressure of 100 psia (85 psig) is maintained on the permeate side of first membrane separation unit, 43. It was further assumed that the first permeate stream (46) is recompressed to 1,00 psia, and that the permeate pressure for the second membrane separation unit is maintained at 50 psia (35 psig).

The assumptions for the membrane performance were as in Example 1(a)(ii).

The results of the calculation are shown in Table 5.

TABLE 5

| | Stream | | | |
|---|---|---|---|---|
| Parameter | 41 Feed | 45 Residue | 46 First permeate | 52 Second permeate |
| Flow rate (MMscfd) | 2.2 | 8.8 | 3.4 | 1.2 |
| Pressure (psig) | 985 | 985 | 85 | 35 |
| Component (vol %) | | | | |
| Methane | 90 | 98 | 70 | 30 |
| Carbon Dioxide | 10 | 2 | 30 | 70 |
| Oxygen | — | — | — | — |
| Nitrogen | — | — | — | — |

The horsepower requirement to operate compressor 47 was calculated to be 900 hp. To generate 900 hp would require about 0.15 MMscfd of pure methane.

As can be seen, the process provides a treated residue stream in which the carbon dioxide content has been reduced to 2 vol %.

Waste stream 52 from the process contains 30 vol % methane, representing a loss of about 4.5% of the total methane content of the feed. In addition, fuel must be supplied to drive the compressor, increasing the total methane loss of the process to about 5.5 or 6%.

Example 4

Process of the Invention

The calculation of Example 3 was repeated, this time assuming that a third, sweep-driven membrane separation step was used to treat half (stream 54) of the second permeate stream according to the process flow scheme of FIG. 5.

Air at atmospheric pressure (stream 57) was assumed to be circulated on the permeate side of the membrane using a blower.

The results of the calculations for the sweep step are shown in Table 6.

TABLE 6

| | Stream | | | |
|---|---|---|---|---|
| Parameter | 54 Feed to sweep step | 58 Upgraded residue gas | 57 Sweep | 59 Permeate/Sweep |
| Flow rate (MMscfd) | 0.62 | 0.26 | 0.6 | 0.92 |
| Pressure (psig) | 35 | 35 | 0 | 0 |
| Component (vol %) | | | | |
| Methane | 30 | 58.0 | — | 3.0 |
| Carbon Dioxide | 70 | 32.9 | — | 37.5 |
| Oxygen | — | 3.5 | 21 | 12.1 |
| Nitrogen | — | 5.6 | 79 | 47.4 |

The third membrane separation step produces a treated residue with an EMC of 70%, which provides all of the energy required to drive the second stage compressor.

The total methane loss in the remaining discharge streams (53 and 59) is reduced to about 2.5-3 vol %.

Example 5

Countercurrent Sweep Membrane Experiments

A number of composite membranes were made by coating selective Hyflon® AF (Solvay) or Cytop® (Asahi) perfluoropolymers onto a polyetherimide (PEI, General Electric) support membrane. The membrane were found to have pure gas permeances of 240 gpu for carbon dioxide, 75 gpu for oxygen, 25 gpu for nitrogen and 10 gpu for methane.

The membranes were operated in a countercurrent test cell (154 cm$^2$ area) with and without a permeate side sweep. The feed contained 47.5% methane in carbon dioxide and was fed into the cell at 50 psig and at a flow rate of 0.2-1.1 scfm/m$^2$. For the pressure-driven experiments, the permeate pressure was varied from 0 psig to 40 psig. For the sweep experiments, the permeate pressure was maintained at 20 psig and air was passed across the permeate side at flow rates of 0.2-1.1 scfm/m$^2$. The selective layer of the membrane was facing the higher pressure feed gas in all cases.

Figure 6:
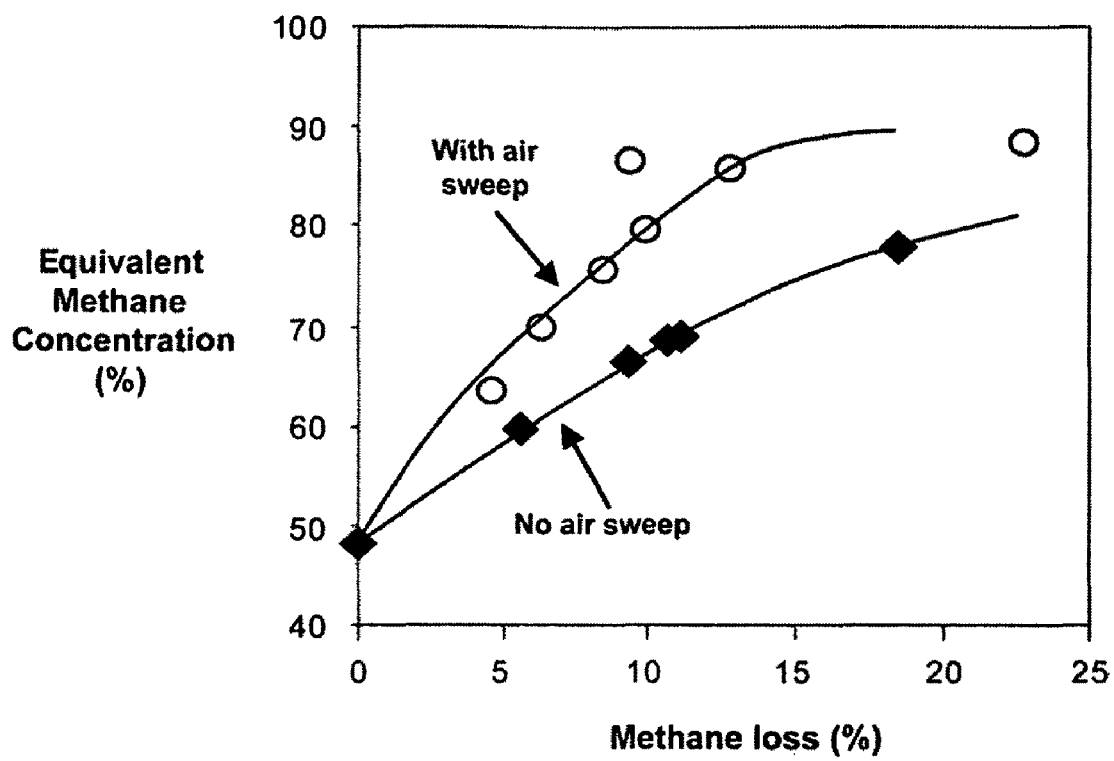
FIG. 6 is a graph of EMC (Equivalent Methane Concentration) as a function of methane loss for a set of experiments to upgrade a feed containing 48 vol % methane.

FIG. 6 summarizes the results for a large set of experiments. The results are shown as the EMC of the product gas versus the methane loss to the air sweep/permeate stream exiting the system.

FIG. 6 clearly shows that use of the air sweep allows the EMC be increased and the loss of methane to be significantly reduced. The oxygen concentration in the methane stream in these experiments ranged from 1 to 5%, which means that oxygen permeation is responsible for up to 30% of the increase in EMC.

Example 6

Countercurrent Sweep Module Experiments

A spiral-wound countercurrent/sweep module was fabricated with the same membrane used in the permeation cell tests of Example 5. The module had one membrane envelope with an effective area of 0.6 m$^2$, about 40 times the area of the permeation cell.

The module was operated with a methane/carbon dioxide feed stream at 50 psig and a flow rate of 0.54 scfm/m$^2$, and an air sweep stream at 0 psig and 0.32 scfm/m$^2$.

Figure 7:
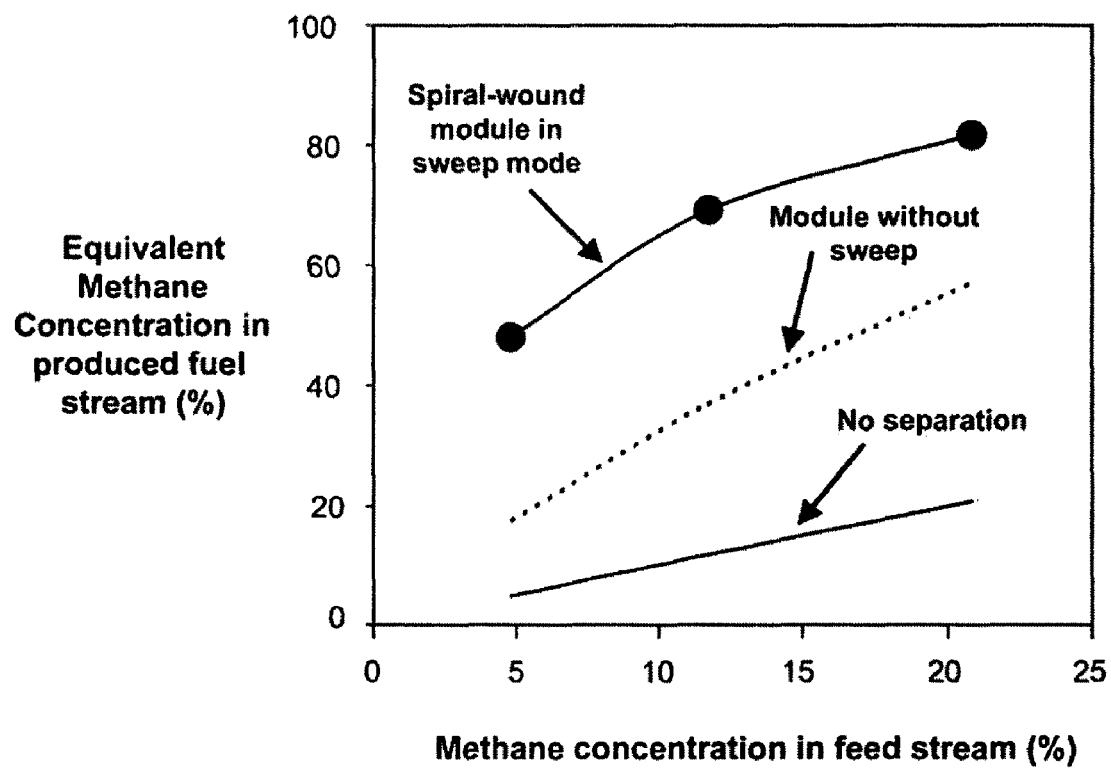
FIG. 7 is a graph of EMC (Equivalent Methane Concentration) as a function of methane concentration in the feed stream for a set of experiments to upgrade a feed containing methane in low concentrations.

FIG. 7 shows the EMC achieved by the module in a single pass as a function of the methane concentration in the feed stream. The data show that the module operating in sweep mode removes more carbon dioxide than the same module operating in pressure-driven mode without sweep. In addition, operation in sweep mode introduces oxygen into the produced fuel stream.

Example 7

To determine the economic feasibility of the process, we performed process simulations for dilute methane streams of 1 MMscfd flow rate with methane concentrations ranging from 20% to 60%. The goal in each case was to create a methane product stream with an EMC of 70%.

The process of FIG. 1 was assumed to be used, with an air sweep flow rate of 1 MMscfd.

Figure 8:
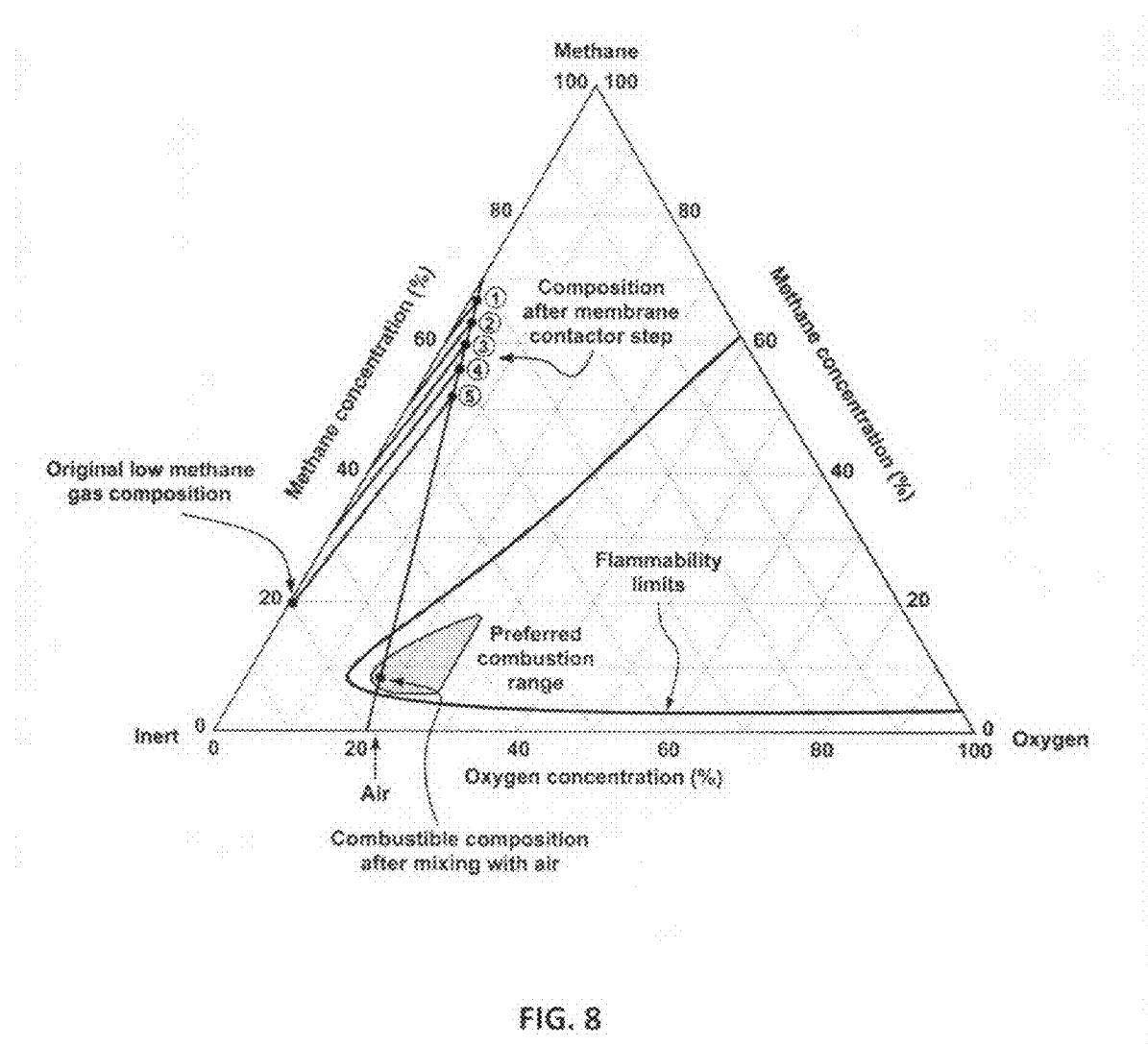
FIG. 8 is a ternary composition diagram showing the composition of a set of feed gases of different methane concentration after treatment according to the invention.

FIG. 8 shows that a fuel with a composition on the 70% EMC line could be generated from all starting compositions.

Table 7 lists the membrane areas required, the methane recoveries achieved, the value of the recovered methane, and the estimated capital cost of the membrane system for each feed composition.

TABLE 7

| Methane Content (vol %) | Membrane Area (m$^2$) | Methane Recovery (%) | Fuel Value of Fuel Product Stream ($000/year)* | Membrane System Capital Cost ($000)** |
|---|---|---|---|---|
| 60 | 260 | 95.8 | 1,260 | 160 |
| 50 | 450 | 92.1 | 1,010 | 270 |
| 40 | 590 | 88.5 | 775 | 354 |
| 30 | 690 | 84.8 | 557 | 414 |
| 20 | 760 | 80.4 | 351 | 456 |

*Based on fuel value of $6/1,000 scf methane
**Based on $600 per square meter installed membrane area As these are passive systems, there are no operating costs beyond occasional performance checks and membrane replacement every few years. Therefore, as can be seen by comparing capital costs with the value of the recovered methane, the systems have low payback times, often of less than one year.

We claim:

1. A process to increase an Equivalent Methane Concentration (EMC) of a gas stream, comprising:
   (a) providing a membrane having a feed side and a permeate side, and being selectively permeable to carbon dioxide over methane and to oxygen over nitrogen;
   (b) passing a raw gas stream comprising methane and carbon dioxide, and having a first EMC, across the feed side;
   (c) passing an oxygen-containing stream across the permeate side;

(d) withdrawing from the feed side a residue stream having a second EMC that is higher than the first EMC;

(e) withdrawing from the permeate side a permeate stream that is enriched in carbon dioxide compared with the oxygen-containing stream.

2. The process of claim 1, wherein the residue stream is enriched in oxygen compared with the raw gas stream.

3. The process of claim 1, wherein the residue stream has an EMC of at least about 60%.

4. The process of claim 1, wherein the residue stream has an EMC of at least about 70%.

5. The process of claim 1, wherein the raw gas stream has a methane concentration of less than about 70 vol %.

6. The process of claim 1, wherein the raw gas stream has a methane concentration of less than about 50 vol %.

7. The process of claim 1, wherein the raw gas stream has a methane concentration of less than about 30 vol %.

8. The process of claim 1, wherein the raw gas stream is selected from the group consisting of natural gas, landfill gas and biogas.

9. The process of claim 1, wherein the raw gas stream comprises an off-gas from a gas separation process.

10. The process of claim 1, wherein the raw gas stream comprises a gas stream that has been treated in an upstream separate membrane separation process.

11. The process of claim 1, wherein the membrane exhibits a carbon dioxide permeance of at least 500 gpu under process operating conditions.

12. The process of claim 1, wherein the air stream follows a sweep flow direction across the permeate side, the raw gas stream follows a feed flow direction across the feed side, and the sweep flow direction is substantially countercurrent to the feed flow direction.

13. The process of claim 1, wherein a first total pressure is maintained on the feed side, a second total pressure is maintained on the permeate side and the first total pressure is greater than the second total pressure.

14. The process of claim 13, wherein the second total pressure is at least atmospheric pressure.

15. The process of claim 1, further comprising sending the residue stream to a fuel line.

16. The process of claim 1, further comprising flaring the residue stream.

* * * * *